Oct. 14, 1941.　　　　J. H. PERONI　　　　2,259,227
DECORATIVE ARTIFICIAL TREE
Filed Dec. 5, 1940　　　2 Sheets-Sheet 1
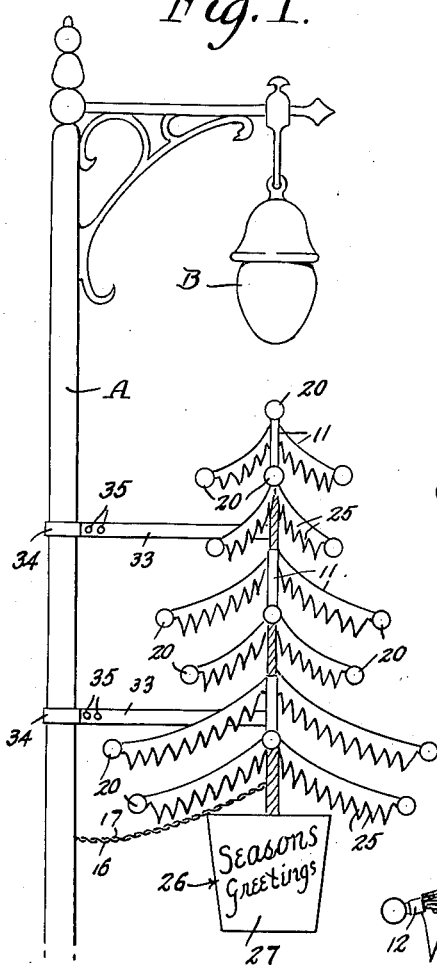
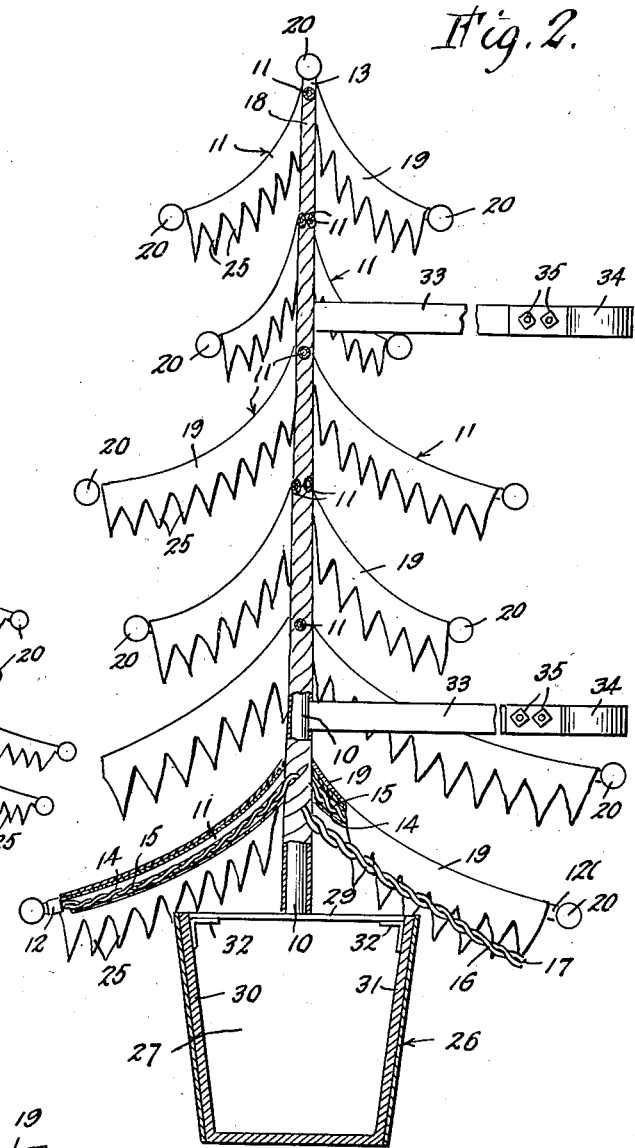
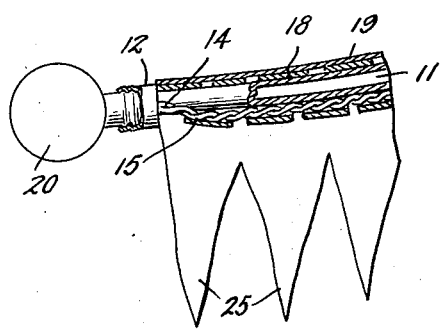
INVENTOR.
JOHN H. PERONI
BY
Clark + Ott
ATTORNEYS Oct. 14, 1941.   J. H. PERONI   2,259,227
DECORATIVE ARTIFICIAL TREE
Filed Dec. 5, 1940   2 Sheets-Sheet 2

INVENTOR.
JOHN H. PERONI
BY Clark & Ott
ATTORNEYS

Patented Oct. 14, 1941

2,259,227

UNITED STATES PATENT OFFICE 2,259,227

DECORATIVE ARTIFICIAL TREE

John H. Peroni, Freeport, N. Y.

Application December 5, 1940, Serial No. 368,587

4 Claims. (Cl. 41—15)

This invention relates to decorative artificial trees and has particular reference to an improved construction of artificial tree which is adapted for the decoration of streets during the holiday season.

The invention comprehends an illuminated decorative artificial tree for outside use which consists of a metallic frame composed of a vertical trunk element and vertically spaced groups of radially disposed branches with adjacent groups of branches circumferentially staggered so as to offer minimum wind resistance and provide a rigid and stable foundation for supporting the illuminating means, and a decorative reflective sheathing covering the frame.

The invention further comprehends an ornamental or decorative tree consisting of a metallic tree frame of tubular construction and having electric light sockets at the ends of the branches thereof, light reflecting material sheathing the tree frame and hanging from the branches in triangular-shaped pendents with lamps arranged in said sockets for illuminating the reflecting material together with bracket arms secured to the tree frame and means at the ends of the arms for anchoring the tree in offset upright relation to suitable supports such as street light posts and standards.

With the foregoing and other objects in view, reference is now made to the following specification and accompanying drawings in which there is illustrated the preferred embodiment thereof.

In the drawings:

Fig. 1 is a side view of a decorative artificial tree constructed in accordance with the invention and illustrating the same affixed to a street light post in offset upright relation therewith to dispose the tree beneath the overhead light.

Fig. 2 is an enlarged vertical sectional view of the tree with the decorative sheathing partially removed to illustrate the underlying electric wiring and the means securing the same to the tree.

Fig. 3 is an enlarged fragmentary vertical sectional view of one of the branches.

Figure 4:
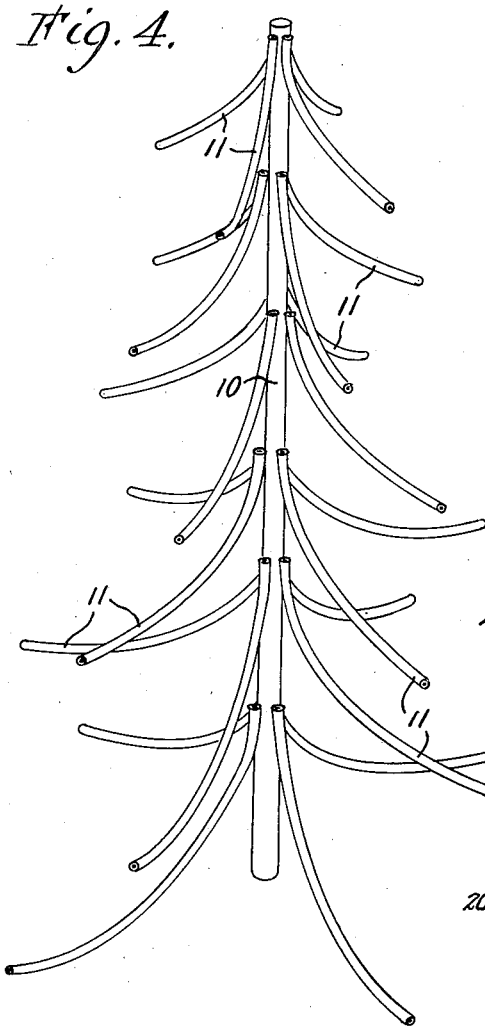
Fig. 4 is an enlarged perspective view of the tree frame.

Referring to the drawings by characters of reference, the tree includes a metallic tree frame consisting of a vertical trunk element 10 and downwardly curved branches 11 both of which preferably are of cylindrical tubular formation. The branches 11 are secured to the trunk 10 by any desired means, such as by welding, and as illustrated the same are arranged in vertically spaced groups with the branches in alternate groups being disposed in substantially radial alignment and circumferentially staggered with reference to the branches in the adjacent groups. The branches of each group are of substantially the same length, with the branches of each downwardly succeeding group being relatively longer than the group above to provide a truncated shaped frame.

Figure 6:
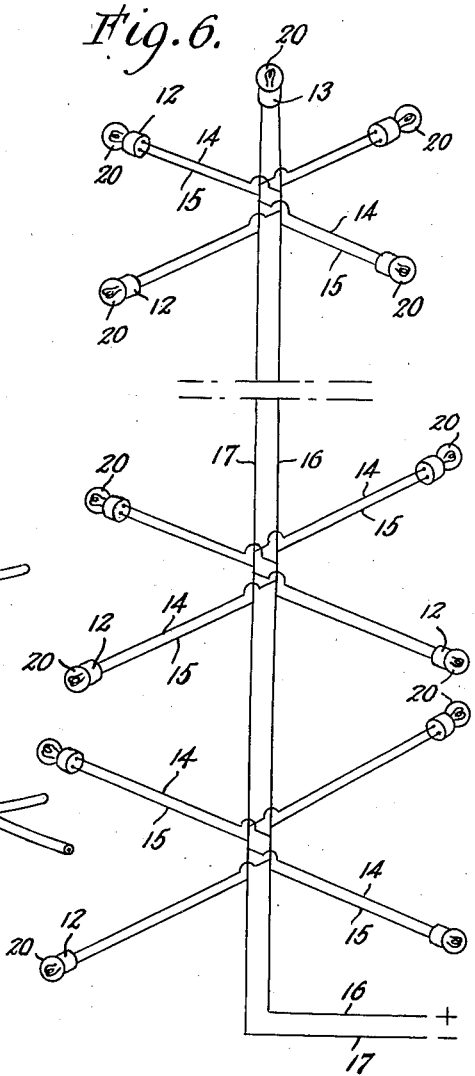
Fig. 6 is a diagrammatic view of the electric wiring.
Figure 5:
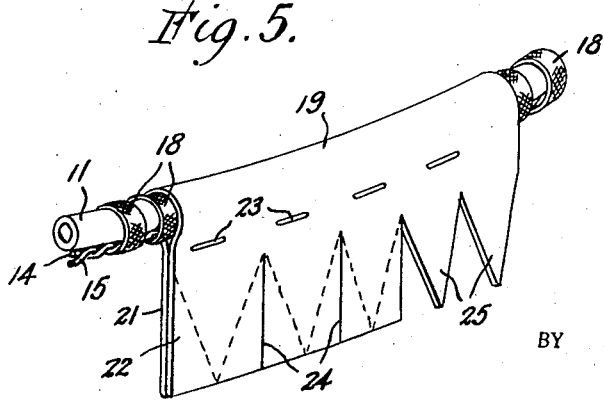
Fig. 5 is an enlarged fragmentary perspective view of one of the branches illustrating the manner of applying the reflective sheathing thereto.

In order to provide means for illuminating the tree, the branches are each provided with an electric socket 12 at the end thereof and the trunk 10 is similarly provided with a socket 13 at the upper end which sockets are secured thereto by any desired means, such as by welding. The sockets 12 are each connected to conductor wires 14 and 15 which are connected in parallel to main conductor wires 16 and 17 as illustrated in Fig. 6. The tree frame provides a support for the conductor wires, the main conductor wires 16 and 17 extending longitudinally of the trunk 10, while conductor wires 14 and 15 extend along each of the branches 11 and have adhesive tape wrappings 18 spirally wound about the conductors and the branches and trunk of the frame to secure the conductors thereto and provide an insulation covering for the conductors. The conductor wires 16 and 17 at their lower ends are adapted to connect with a source of current supply and at the upper ends thereof connect with the socket 13 at the upper end of the trunk 10.

The branches 10 and 11 are covered with a light reflecting sheathing 19 which is crumpled as the same is applied thereto so as to provide a faceted surface for reflecting the light from the lamps 20 carried by the sockets 12 and 13 while affording a protecting covering for the wrappings 18 and the conductor wires. The sheathing is folded over the branches and the depending leaves 21 and 22 of the fold are secured together beneath the branches by staples 23 or other securing means. The secured leaves 21 and 22 are vertically slitted as at 24 and the edge portions adjacent the slits folded upon the leaves to provide a row of triangular shaped light reflecting pendents 25 beneath each branch.

The tree is provided with a base indicated generally by the reference character 26 which is of hollow formation and provided with opposite light transmitting walls 27 for displaying indicia such as seasonal greetings and which base is open at its top and is secured to the trunk 10 by a cross strap 29 welded or otherwise secured to the bottom of the trunk and anchored to the opposite sides 30 and 31 of the base by brackets 32 riveted or otherwise secured to the ends of the strap 29 and the side walls 30 and 31.

The tree is adapted to be supported by a street light post or standard in offset upright relation therewith to dispose the tree beneath the street light and as illustrated a pair of bracket arms 33 are secured to the trunk 10 and provided at their free ends with split collars 34 adapted to engage about the light standard such as the standard A and to be secured in position under the lamp B thereof by the tightening of the bolts 35. This disposes the tree in a position where it is floodlighted by the lamp B so that the light therefrom is reflected by the sheathing 19, which sheathing also reflects other neighboring lights not carried by the tree itself.

What is claimed is:

1. In an artificial tree, a metallic tree frame including a trunk and vertically spaced groups of curved branches secured to the trunk with the branches of alternate groups disposed in substantially radial alignment and circumferentially staggered with reference to the branches of the remaining groups, light reflecting material covering the trunk and branches and hanging from the branches in pendent formation, and a pair of bracket arms secured to the tree trunk having clamping means at the ends thereof adapted for anchoring the tree to a vertical support.

2. In an artificial tree, a metallic tree frame including a tubular trunk and vertically spaced groups of downwardly curved tubular branches secured to the trunk, a decorative sheathing of light reflecting metallic material covering the trunk and branches and hanging from the branches in pendent formation, said branches adapted to carry electric lamps for illuminating the reflecting material and a pair of bracket arms secured to the tree trunk having clamping means at the ends thereof adapted for engagement with a vertical supporting structure for anchoring the tree in offset vertical relation therewith.

3. In an artificial tree, a metallic tree frame including a tubular trunk and vertically spaced groups of downwardly curved tubular branches secured to the trunk, and a decorative sheathing including strips of a light reflecting metallic material arranged in folds over the branches with the folds secured together beneath the branches and with the bottom edges of the folds slitted and folded to provide triangular shaped pendents.

4. In an artificial tree, a metallic tree frame including a trunk and vertically spaced groups of branches secured to the trunk with the branches of certain groups circumferentially staggered with reference to the branches of the remaining groups, and a pair of bracket arms secured to the tree trunk having clamping means at the ends thereof adapted for anchoring the tree to a vertical support.

JOHN H. PERONI.